US 6,658,844 B1

(12) United States Patent
Lammers

(10) Patent No.: US 6,658,844 B1
(45) Date of Patent: Dec. 9, 2003

(54) PLASTIC MASTER CYLINDER FOR HYDRAULIC BRAKE SYSTEM

(75) Inventor: Tim E. Lammers, Boyden, IA (US)

(73) Assignee: Dethmers Manufacturing Company, Boyden, IA (US)

( * ) Notice: Subject to any disclaimer, the term of this patent is extended or adjusted under 35 U.S.C. 154(b) by 0 days.

(21) Appl. No.: 10/119,478

(22) Filed: Apr. 10, 2002

(51) Int. Cl.[7] ................................................. B60T 11/26
(52) U.S. Cl. ......................................... 60/585; 116/227
(58) Field of Search .................... 60/533, 585, 586; 116/227, 228

(56) References Cited

U.S. PATENT DOCUMENTS

| | | | | |
|---|---|---|---|---|
| 3,156,097 A | * | 11/1964 | Brown | 60/586 |
| 3,981,147 A | * | 9/1976 | Ban et al. | 60/425 |
| 4,133,287 A | * | 1/1979 | Downs | 116/227 |
| 4,528,895 A | * | 7/1985 | Nakamura | 60/589 |
| 4,544,075 A | * | 10/1985 | Nakamura | 60/534 |
| 4,671,065 A | * | 6/1987 | Ishiwata | 60/533 |
| 4,823,553 A | * | 4/1989 | Reynolds | 60/585 |
| 6,085,523 A | * | 7/2000 | Buckley et al. | 60/585 |

OTHER PUBLICATIONS

Installation and Bleeding Instructions Wilwood Composite Master Cylinders Dec. 1996.
Autosite.com Web Pages Master Cylinders, Brake Fluid and Bleeding Aug. 13, 2001.

* cited by examiner

Primary Examiner—Edward K. Look
Assistant Examiner—Thomas E Lazo
(74) Attorney, Agent, or Firm—Brian J. Laurenzo; Michael C. Gilchrist; Jason M. Hunt

(57) ABSTRACT

A master cylinder having a reservoir and a cylinder formed from a single piece of molded plastic. A sight gauge is molded into a sidewall of the reservoir to permit the level of hydraulic fluid to be checked without removing the reservoir's cap. A vent hole and a replenishing hole permit hydraulic fluid to flow between the reservoir and the cylinder. A baffle is provided to deflect "geysers" that can occur during brake bleeding when hydraulic fluid is forced up through the replenishing port. In the preferred embodiment, the baffle includes an upright portion that is used to retain a float in alignment with the sight gauge.

17 Claims, 4 Drawing Sheets

PLASTIC MASTER CYLINDER FOR HYDRAULIC BRAKE SYSTEM

BACKGROUND OF THE INVENTION

This invention relates generally to master cylinders used in brake systems and more specifically to a plastic master cylinder for use in hydraulic brake systems.

Master cylinders are components used in hydraulic brake systems. Typically they include a reservoir and a cylinder body. The reservoir portion sits above the cylinder body. The reservoir contains a supply of hydraulic fluid. Orifices connect the reservoir portion with the cylinder portion to permit the hydraulic fluid to flow between the reservoir and the cylinder. The cylinder contains a piston that moves back and forth within the cylinder to pressurize the hydraulic fluid in order to activate the brake system. The cylinder and the reservoir may be molded as a single piece of metal, or, they may be separate pieces.

In the past master cylinders, particularly those used in surge brake systems, have been made of cast iron or aluminum. One problem associated with such systems is that they are susceptible to corrosion. The corrosion can contaminate the brake fluid causing excessive wear of brake components. In severe cases, the corrosion may cause leakage of brake fluid, and failure of the brake system. The cylinder portion of metal master cylinders typically must be machined to meet the tolerance requirements of brake systems, which adds to the expense in manufacturing such devices. An additional drawback is the heavy weight of metal parts. Often times metal master cylinders are treated with a rust preventative, which adds to the cost of manufacture.

An additional problem with standard master cylinders are "geysers" that can occur during bleeding of the brake system. Residual pressure in the system can cause the brake fluid to shoot up through the ports between the cylinder and the reservoir, often shooting several inches above the master cylinder. This is messy, can damage components surrounding the master cylinder, and can even be dangerous if the brake fluid gets in the eyes of the person who removed the master cylinder cap.

The reservoir portion of master cylinders, especially metal ones that are formed as a single piece, are typically opaque. The level of brake fluid is checked using a dip stick, or a visual inspection of the inside of the reservoir. It would be preferable to be able to check the fluid level by a visual inspection of the outside of the master cylinder without the need to remove the cap, or use a dip stick.

These and other difficulties are overcome by the present invention.

BRIEF SUMMARY OF THE INVENTION

Accordingly, it is a primary object of the present invention to provide a master cylinder wherein the reservoir and cylinder portions of the master cylinder are molded as a single piece of plastic.

It is a further object of the present invention to provide a master cylinder wherein the bore portion of the cylinder is formed during the molding process without any need for secondary machining.

It is an additional object of the present invention to provide a master cylinder that permits the level of hydraulic fluid in the reservoir to be observed through a sight gauge molded into the reservoir, without removing the cap of the master cylinder.

It is another object of the present invention to provide a master cylinder that deflects geysers that can occur through the replenishing port.

It is yet another object of the present invention to include a baffle that deflects geysers that can occur through the replenishing port and retain a float in alignment with a sight window to permit a determination of the level of hydraulic fluid in the reservoir without removing the reservoir cap.

DETAILED DESCRIPTION OF THE INVENTION

Figure 1:
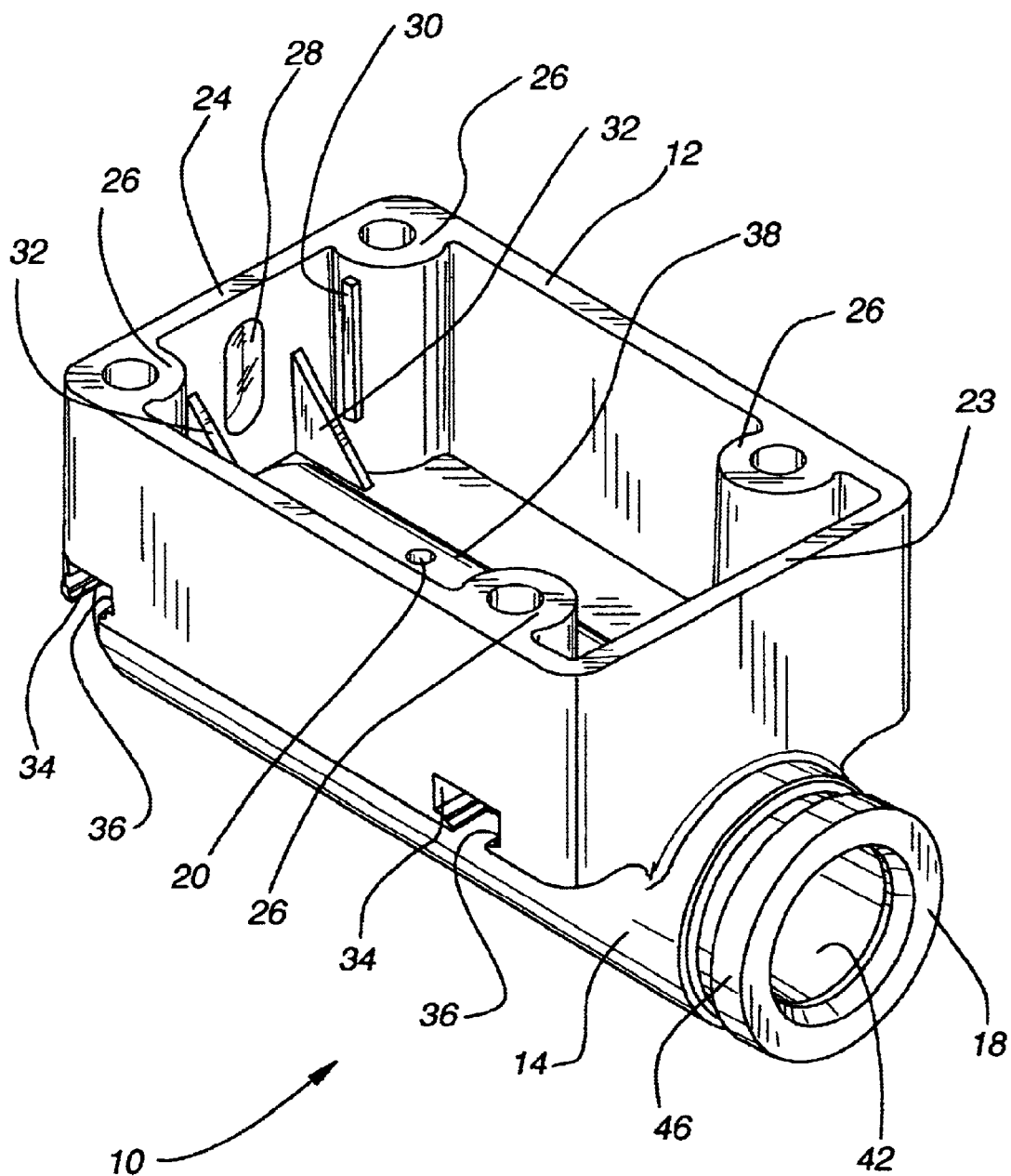
FIG. 1 is an isometric view of a preferred embodiment of a master cylinder according to the present invention.
Figure 2:
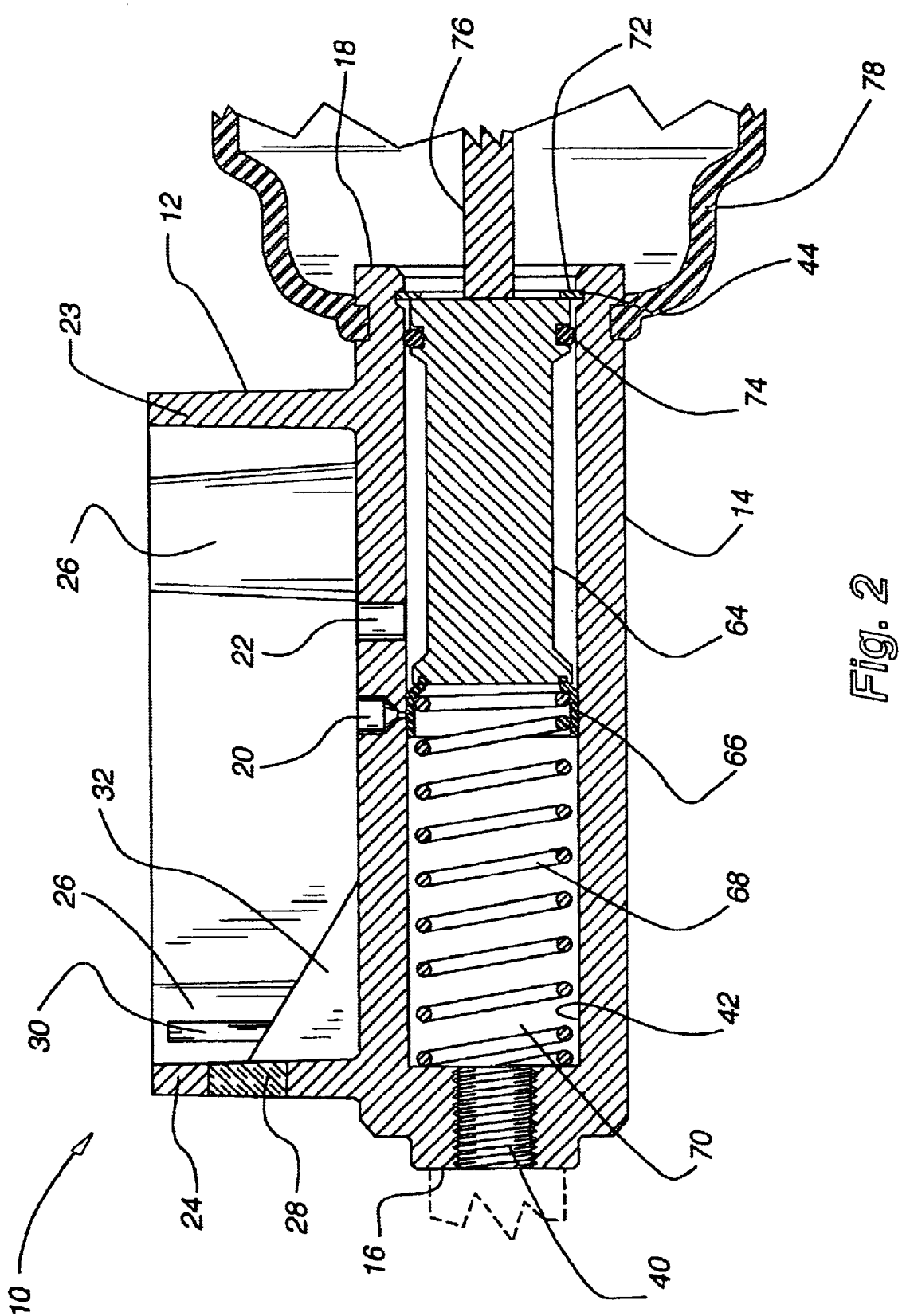
FIG. 2 is a cut-away view of a master cylinder according to the present invention.
Figure 3:
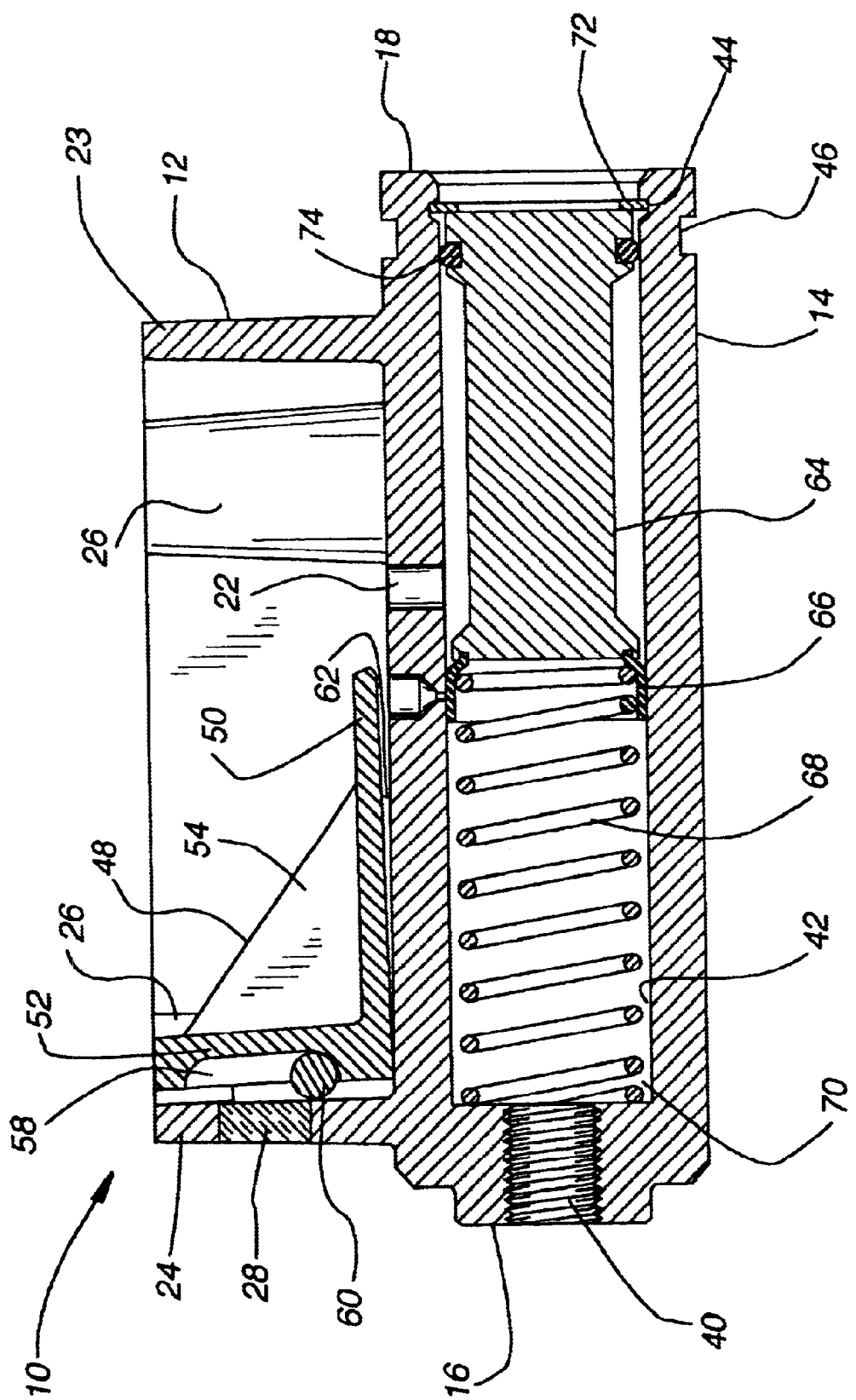
FIG. 3 is a cut-away view of a master cylinder according to the present invention including a splash baffle.
Figure 6:
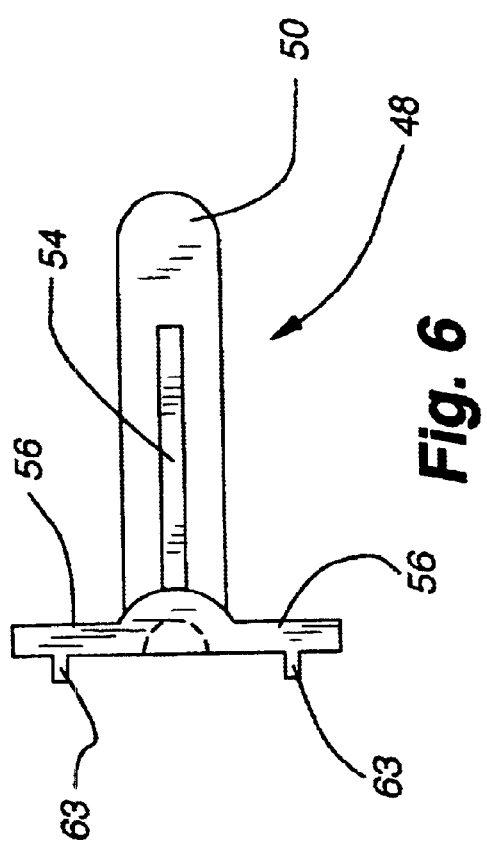
FIG. 6 is a top view of the splash baffle shown in FIG. 4.
Figure 5:
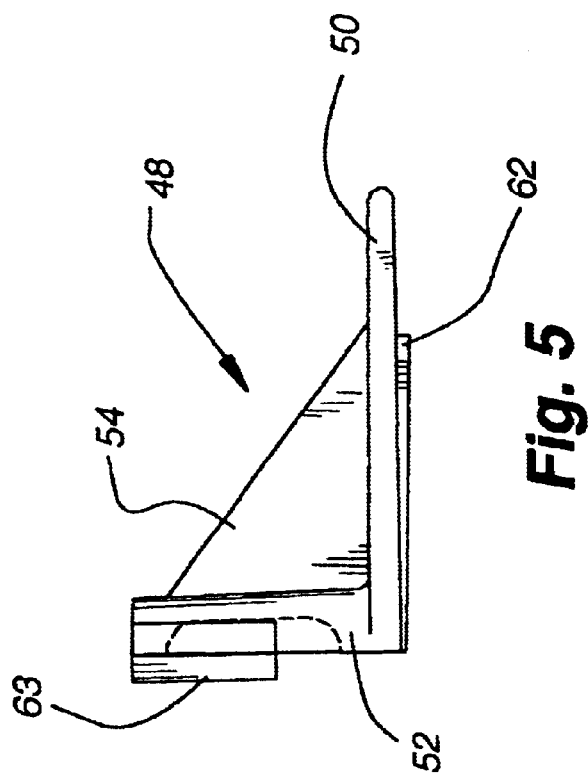
FIG. 5 is a side view of the splash baffle shown in FIG. 4.
Figure 4:
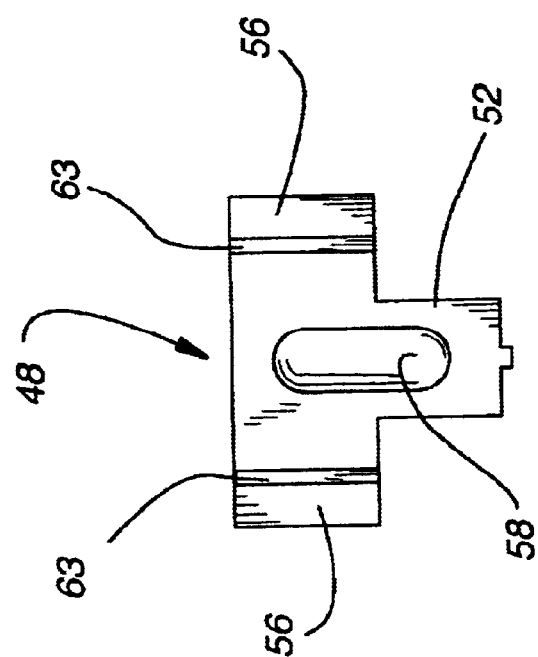
FIG. 4 is a rear view of a splash baffle.

Shown generally in the drawings is a master cylinder 10. The master cylinder 10 has a reservoir 12 and a cylinder 14. The reservoir 12 sits on top of the cylinder 14. The cylinder 14 has a brake-line end 16 and a push-rod end 18. A pair of holes connect the reservoir 12 with the cylinder 14. The hole nearest to the brake-line end 16 is the replenishing port 20, and the hole nearest to the push-rod end 18 is the vent port 22. The replenishing port 20 is a much smaller hole than the vent port 22.

The reservoir 12 has generally vertical front 23 and rear 24 sidewalls. The sidewalls 23, 24 may taper from bottom to top, such that they are slightly thicker where they meet the cylinder 14 than at the top of the sidewalls 23, 24. This taper facilitates removing the master cylinder 10 from the mold during manufacture. Bolt sleeves 26 are provided near each corner of the reservoir 12. The bolt sleeves 26 also preferably have sidewalls that taper from bottom to top. The rear bolt sleeves 26 are provided with retaining ridges 30 that extend towards each other parallel to the rear sidewall 24. The rear sidewall 24 has a transparent sight gauge 28, roughly centered on the rear sidewall 24. Gussets 32 are provided between the bottom portion of the rear sidewall 24 and the top of the cylinder 14 to provide support for the rear sidewall 24. Nut slots 34 are provided at the bottom of the reservoir 12 corresponding to each bolt sleeve 26. Preferably the nut slots 34 have an interference ridge 36 that provides an interference fit with a corresponding nut to hold the nut in place in the nut slot 34. The bottom of the reservoir 12 extends below the top of the cylinder 14, therefore, the bottom interior of the reservoir 12 is humped in the middle, and has low spots, or troughs 38, that run along the top of cylinder 14.

The brake-line end 16 of the cylinder 14 has a threaded outlet 40 where an outlet line of the brake system may be attached. A smooth bore 42 runs from the outlet 40 towards the push-rod end 18 of the cylinder 14. The bore 42 is preferably as straight as possible. A snap ring retaining slot 44 is formed at the push-rod end 18 of the bore 42. The push-rod end 18 of the cylinder 14 extends beyond the front sidewall 24 of the reservoir 12. A groove 46 is formed on the exterior of the cylinder 14 near the push-rod end 18 of the cylinder 14. This groove 46 is for engagement with a boot that covers the push-rod assembly.

A splash baffle 48 may be provided. The splash baffle 48 has a baffle leg 50 that extends generally horizontally and axially from the rear sidewall 24 towards the front such that the baffle leg 50 extends over the replenishing port 20. A generally vertical riser leg 52 joins the baffle leg 50 at the rear of the splash baffle 48. A support gusset 54 spans between the riser leg 52 and the baffle leg 50. The top of the riser leg 52 is provided with transversely extending wings 56. The wings 56 engage the retaining ridges 30 on the rear bolt sleeves 26 to hold the splash baffle 48 in its operable position. Preferably, the riser leg 52 aligns with the sight gauge 28. Spacers 63 on the wings 56 maintain the top of the baffle 48 at the proper spacing from the rear wall 24 of the reservoir 12. A ball retaining trough 58 is formed in the riser leg 52. A small level-indicating ball 60 is captured between the ball retaining trough 58 and the sight gauge 28. The level-indicating ball 60 should be lighter than the hydraulic fluid, such that if floats, and should preferably be made of a highly visible material, such as a florescent orange plastic. An offset ridge 62 may be provided on the bottom of the baffle leg 50 to maintain the baffle leg 50 slightly above the top of the cylinder 14 so that it does not plug the replenishing port 20.

The reservoir 12 and cylinder 14 are molded as a single unit out of long fiber glass reinforced nylon. As a result, almost all of the features of the master cylinder 10 can be formed without secondary machining. The only feature that typically requires secondary machining is the snap-ring retaining slot 44. It is possible to form the snap-ring retaining slot in the initial molding; however it requires a retractable portion of the mold, which may not be cost effective. Importantly, the bore 42 is molded to shape without any secondary machining.

The sight gauge 28 is molded into the rear sidewall 24 during the molding process. Preferably the sight gauge 28 is made from a transparent plastic or glass material. The gussets 32 are necessary because the sight gauge 28 weakens the rear sidewall 24 and excessive flexing may occur if the gussets 32 are not provided.

The preferred use of the master cylinder 10 is in a surge brake system as might be found in a trailer. Typically, the master cylinder 10 is part of a brake actuator that bolts to the tongue of a trailer. The master cylinder 10 is bolted to the top of the actuator such that the bottom surface of the top of the actuator acts as the top cover of the reservoir 12. Alternatively, the master cylinder 10 may be bolted directly to the hitch of the trailer such that a portion of the hitch acts as the top cover of the reservoir 12. A gasket may be provided to seal the top of the reservoir 12. Alternatively, a separate cover may be provided for the reservoir 12.

A standard piston assembly may be used within the bore 42 of the cylinder 14. Typically the piston assembly will include at least a front gasket 74, a primary piston 64, a piston cup 66, a spring 68, and a check valve 70. The check valve 70 retains about 5 to 10 pounds per square inch of pressure on the hydraulic fluid, and is for use with drum brake systems to keep cup seals in the drum brakes expanded when the brakes are unactivated. The piston assembly is retained in the bore 42 by a snap ring 72 seated in the snap ring retaining slot 44. A push rod 76 butts against the primary piston 64. A rubber boot 78, engaged by the boot groove 46, covers and protects the push rod 76.

When the brake assembly is in the neutral, unactivated position, the piston cup 66 is located between the replenishing port 20 and the vent port 22. The piston cup 66 traps hydraulic fluid on the brake-line side of it, but permits hydraulic fluid to flow from the push-rod side to the brake-line side. When the brakes are activated, either by a surge of the trailer relative to the towing vehicle in the case of a surge brake, by a break-away mechanism, or by the depressing of a brake pedal in a user-controlled system, the push rod 76 pushes against the primary piston 64, pushing the primary piston 64 and piston cup 66 against the spring 68 towards the brake-line end 16 of the cylinder 14. As the piston cup 66 moves towards the brake-line end 16, it covers the replenishing port 20, and thereby pressurizes the hydraulic fluid on the brake-line side of the replenishing port 20, thereby applying the brakes.

When the brakes are released, the spring 68 snaps the primary piston 64 and piston cup 66 back to the neutral position. This creates a momentary vacuum on the brake-line side of the piston cup 66. To compensate for the vacuum, fluid flows from the reservoir 12, through the vent port 22, and then through holes in the primary piston 64, and around the piston cup 66.

During bleeding of the brake system, the cap to the reservoir 12 is removed. It is common in such process for the piston cup 66 to move towards the brake-line end 16 of the cylinder 14, thereby pressurizing the hydraulic fluid on the brake-line side of the piston cup, which can cause hydraulic fluid to shoot up through the replenishing port, and possibly out of the reservoir 12. In standard master cylinders this can be annoying and potentially even dangerous to people and harmful to surrounding parts. However, in the preferred embodiment of the present invention, the hydraulic fluid that shoots up out of the replenishing port 20 is deflected by the baffle leg 50 of the splash baffle 48.

There are several other advantages to the above described system over standard existing master cylinders. Because it is made of long fiber reinforced nylon, it will not corrode, and it does not need to be painted or otherwise surface treated. Because it can be molded to size, it is not necessary to perform machining to create the bore 42 in the cylinder 12. The molded-in sight gauge 28 permits an operator to check the level of hydraulic fluid without opening the system. This is quicker and easier, and makes contamination of the brake fluid less likely.

Because the mounting bolts pass all the way through the reservoir and into the nuts in the nut slots 34, they help to provide stiffness and support to the sidewalls 24. In standard designs, the mounting bolts thread directly into the top portion of the reservoir.

Troughs 38 formed on the bottom interior of the reservoir 12 provide a trap that retains any impurities that are heavier than the hydraulic fluid, and prevent them from entering the brake system.

What is claimed is:

1. A master cylinder for use in a braking system, the master cylinder comprising:
   a cylinder portion;
   a reservoir portion, said reservoir portion and said cylinder portion being molded from a single piece of plastic;
   a vent port between said cylinder portion and said reservoir portion;
   a replenishing port between said cylinder portion and said reservoir portion; and
   a splash baffle within said reservoir portion covering said replenishing port to deflect pressurized hydraulic fluid forced from said cylinder portion into said reservoir portion through said replenishing port.

2. The master cylinder according to claim 1, wherein said plastic is a long glass fiber reinforced plastic.

3. The master cylinder according to claim 2, wherein said plastic is a nylon.

4. The master cylinder according to claim 1, further compromising:
 a transparent sight gauge molded into said reservoir portion;
 a float ball; and
 a ball retaining portion of said splash baffle that retains said float ball in alignment with said transparent sight gauge such that a level of hydraulic fluid can be determined by viewing said float ball through said transparent sight gauge.

5. The master cylinder according to claim 1, wherein said cylinder portion has a bore that is formed during a molding process without any machining.

6. The master cylinder according to claim 1, wherein said reservoir portion has a bottom, and wherein said bottom of said reservoir portion has troughs formed therein to capture and retain impurities.

7. A master cylinder for use in a braking system, the master cylinder comprising:
 a cylinder portion;
 a reservoir portion, said reservoir portion and said cylinder portion being molded from a single piece of plastic; and
 wherein said reservoir portion has a bottom, and wherein said bottom of said reservoir portion has troughs formed therein to capture and retain impurities.

8. The master cylinder according to claim 7, further comprising:
 a vent port between said cylinder portion and said reservoir portion;
 a replenishing port between said cylinder portion and said reservoir portion; and
 a splash baffle within said reservoir portion covering said replenishing port to deflect pressurized hydraulic fluid forced from said cylinder portion into said reservoir portion through said replenishing port.

9. The master cylinder according to claim 8, further compromising:
 a transparent sight gauge molded into said reservoir portion;
 a float ball; and
 a ball retaining portion of said splash baffle that retains said float ball in alignment with said transparent sight gauge such that a level of hydraulic fluid can be determined by viewing said float ball through said transparent sight gauge.

10. The master cylinder according to claim 7, wherein said plastic is a long glass fiber reinforced plastic.

11. The master cylinder according to claim 7, wherein said plastic is a nylon.

12. The master cylinder according to claim 7, wherein said cylinder portion has a bore that is formed during a molding process without any machining.

13. A master cylinder for use in a braking system, the master cylinder comprising:
 a cylinder portion;
 a reservoir portion, said reservoir portion and said cylinder portion being molded from a single piece of plastic;
 a transparent sight gauge molded into said reservoir portion;
 a float ball; and
 a ball retaining portion that retains said float ball in alignment with said transparent sight gauge such that a level of hydraulic fluid can be determined by viewing said float ball through said transparent sight gauge.

14. The master cylinder according to claim 13, further comprising:
 a vent port between said cylinder portion and said reservoir portion;
 a replenishing port between said cylinder portion and said reservoir portion; and
 a splash baffle within said reservoir portion covering said replenishing port to deflect pressurized hydraulic fluid forced from said cylinder portion into said reservoir portion through said replenishing port.

15. The master cylinder according to claim 13, wherein said cylinder portion has a bore that is formed during a molding process without any machining.

16. The master cylinder according to claim 13, wherein said plastic is a long glass fiber reinforced plastic.

17. The master cylinder according to claim 13, wherein said plastic is a nylon.

* * * * *